(12) United States Patent
Ozaki

(10) Patent No.: US 11,727,896 B2
(45) Date of Patent: Aug. 15, 2023

(54) APPARATUS AND METHOD FOR DISPLAY CONTROL, AND RECORDING MEDIUM

(71) Applicant: Hiroki Ozaki, Tokyo (JP)

(72) Inventor: Hiroki Ozaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/449,965

(22) Filed: Oct. 5, 2021

(65) Prior Publication Data

US 2022/0122565 A1    Apr. 21, 2022

(30) Foreign Application Priority Data

Oct. 19, 2020  (JP) ................................. 2020-175522

(51) Int. Cl.
*G09G 5/14* (2006.01)
*G06F 3/04883* (2022.01)

(52) U.S. Cl.
CPC ........... *G09G 5/14* (2013.01); *G06F 3/04883* (2013.01); *G09G 2340/0464* (2013.01); *G09G 2354/00* (2013.01)

(58) Field of Classification Search
CPC ............. G09G 5/14; G09G 2340/0464; G09G 2354/00
See application file for complete search history.

(56) References Cited

U.S. PATENT DOCUMENTS

| 8,519,971 B1* | 8/2013 | Mackraz ............... G06F 3/0488 715/702 |
| 2010/0149206 A1* | 6/2010 | Shigehisa ........... G06F 3/04883 345/173 |
| 2012/0259879 A1 | 10/2012 | Ozaki et al. |
| 2013/0162663 A1 | 6/2013 | Mano et al. |
| 2014/0130028 A1 | 5/2014 | Maeda et al. |
| 2014/0379751 A1 | 12/2014 | Nakamura et al. |
| 2017/0168808 A1 | 6/2017 | Kakei et al. |
| 2019/0033935 A1 | 1/2019 | Ozaki |
| 2019/0036769 A1 | 1/2019 | Nakao et al. |
| 2019/0189088 A1* | 6/2019 | Saito ....................... G06F 3/165 |

FOREIGN PATENT DOCUMENTS

| JP | 2014-022901 | 2/2014 |
| JP | 2017-168039 | 9/2017 |
| JP | 2017-224985 | 12/2017 |

* cited by examiner

*Primary Examiner* — Samantha (Yuehan) Wang
(74) *Attorney, Agent, or Firm* — IPUSA, PLLC

(57) ABSTRACT

An apparatus, a method, and a control program stored in a non-transitory recording medium, for controlling display, each of which: displays one or more contents in a displayable area of a display, in response to an operation received from a first user; determines a part of the displayable area hidden by the first user, as a blind spot area for a second user, the second user locating farther from the display than the first user; detects a written content written in the blind spot area; determines at least one related content related to the written content that is detected, from the one or more contents displayed on the display; and controls the display to display the written content written in the blind spot area, and the related content related to the written content, in a part of the displayable area other than the blind spot area.

11 Claims, 13 Drawing Sheets

APPARATUS AND METHOD FOR DISPLAY CONTROL, AND RECORDING MEDIUM

CROSS-REFERENCE TO RELATED APPLICATIONS

This patent application is based on and claims priority pursuant to 35 U.S.C. § 119(a) to Japanese Patent Application No. 2020-175522, filed on Oct. 19, 2020, in the Japan Patent Office, the entire disclosure of which is hereby incorporated by reference herein.

BACKGROUND

Technical Field

The present invention relates to an apparatus and method for display control, and a non-transitory recording medium.

Related Art

An operator operating the digital signage stays near a display surface on which content is displayed. For this reason, a person behind the operator operating the digital signage cannot visually recognize a part of the content, as a part of the display surface is hidden by the operator. In view of this, there is a technique that displays content in an area other than a blind spot area for the person near the operator.

SUMMARY

Example embodiments include an apparatus, a method for controlling display, and a control program stored in a non-transitory recording medium, each of which: displays one or more contents in a displayable area of a display, in response to an operation received from a first user; determines a part of the displayable area hidden by the first user, as a blind spot area for a second user, the second user locating farther from the display than the first user; detects a written content written in the blind spot area; determines at least one related content related to the written content that is detected, from the one or more contents displayed on the display; and controls the display to display the written content written in the blind spot area, and the related content related to the written content, in a part of the displayable area other than the blind spot area.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
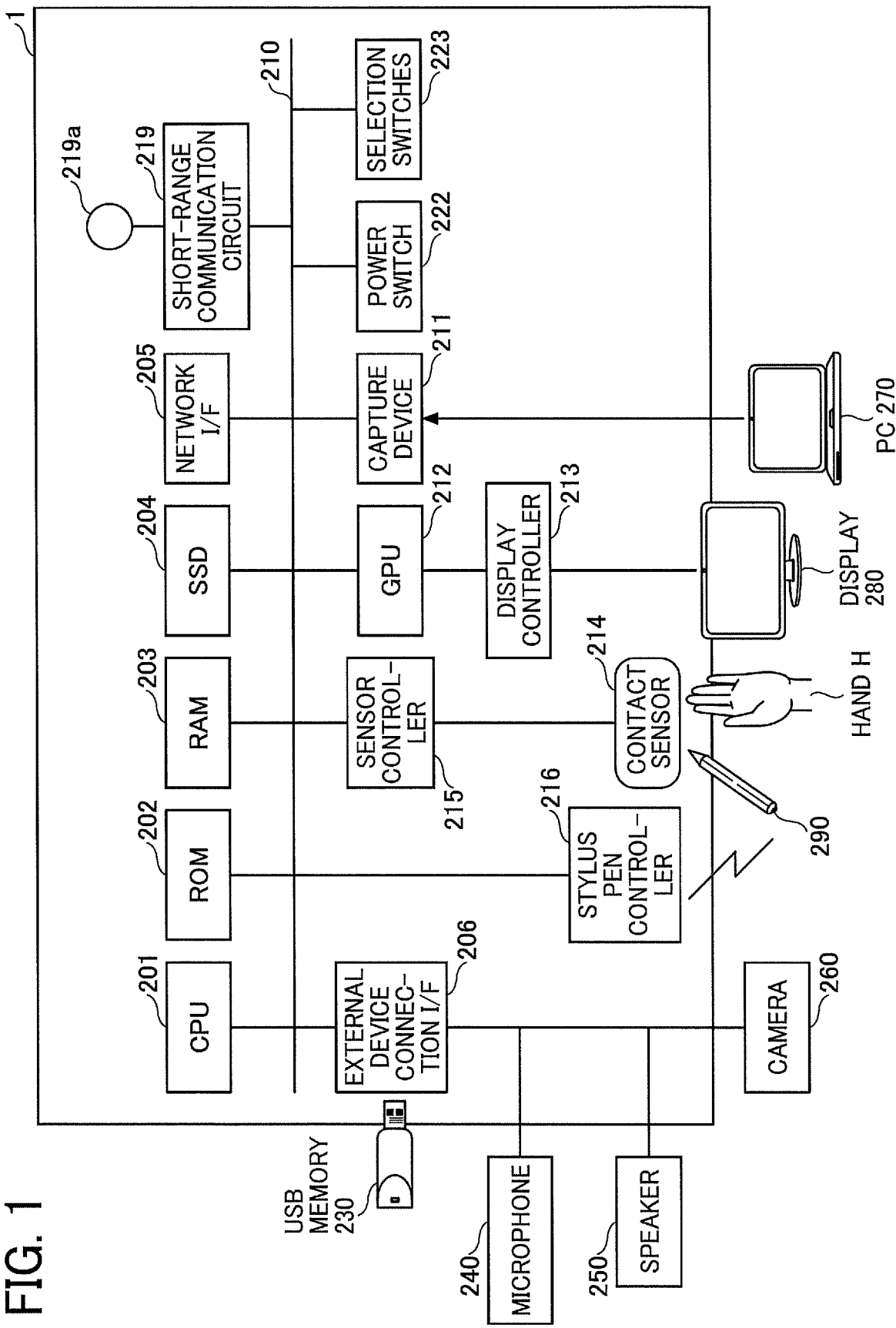
FIG. 1 is a schematic diagram illustrating a hardware configuration of an electronic whiteboard according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present invention will be described with reference to the drawings. In the following description, the electronic whiteboard 1 is an example of a display input device that displays content on a display and receives an operation on the display. However, the display input device is not limited to the electronic whiteboard 1.

First Embodiment

Hardware Configuration of Electronic Whiteboard

Referring to FIG. 1, an overall configuration of an electronic whiteboard 1 is described according to an embodiment. FIG. 1 is a schematic diagram illustrating a hardware configuration of the electronic whiteboard 1 according to the embodiment. The electronic whiteboard 1 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls entire operation of the electronic whiteboard 1. The ROM 202 stores a program such as an initial program loader (IPL) used for executing the CPU 201. The RAM 203 is used as a work area for the CPU 201. The SSD 204 stores various data such as a control program for the electronic whiteboard 1. The network I/F 205 controls communications through a network.

The external device connection I/F 206 is an interface for connecting to various external devices. Examples of the external devices include, but are not limited to, a universal serial bus (USB) memory, and any device that can be connected to the electronic whiteboard 1, such as a microphone 240, a speaker 250, and a camera 260.

The electronic whiteboard 1 further includes a capture device 111, a graphics processing unit (GPU) 212, a display controller 213, a contact sensor 214, a sensor controller 215, a stylus pen controller 216, a short-range communication circuit 219, an antenna 219a for the short-range communication circuit 219, a power switch 222, and selection switches 223.

The capture device 211 displays image data as a still image or a moving image on a display of a personal computer (PC) 270, which is external to the electronic whiteboard 1. The GPU 212 is a semiconductor chip dedicated to graphics. The display controller 213 controls display of an image processed at the GPU 212 for output through the display 280 provided with the electronic whiteboard 1. The display 280 is an example of a display (display device).

The contact sensor 214 detects a touch onto the display 280 with a stylus pen 290 or a user's hand H. The sensor controller 215 controls processing performed by the contact sensor 214. The contact sensor 214 inputs and senses a coordinate by an infrared blocking system. To input coordinates and detect such coordinates, two light receiving elements, disposed on both upper side ends of the display 280, emit a plurality of infrared rays in parallel to a surface of the display 280. Then, the emitted infrared rays are reflected by a reflector frame provided surrounding the sides of the display 280. The light receiving elements receive lights passing in the direction that is the same as an optical path of the emitted infrared rays, which are reflected by the reflector frame.

The contact sensor 214 outputs, to the sensor controller 215, the ID of the infrared ray that was blocked by the object and could not be received. The sensor controller 215 specifies a coordinate position which is a contact position of the object. The stylus pen controller 216 communicates with the stylus pen 290 and determines whether or not the display 280 is touched by the pen tip or the pen bottom.

The short-range communication circuit 219 is a communication circuit that communicates in compliance with the near field communication (NFC), the Bluetooth (Registered Trademark), and the like. The power switch 222 turns on or off the power of the electronic whiteboard 1. The selection switches 223 are a group of switches for adjusting brightness, hue, etc., of display on the display 280, for example. The electronic whiteboard 1 includes a bus line 210. The bus line 210 is, for example, an address bus or a data bus that electrically connects the elements illustrated in FIG. 2, such as the CPU 201.

The system that the contact sensor 214 applies is not limited to the infrared blocking system. Various methods such as an electrostatic capacitance method, a resistive film method, and an electromagnetic induction method may be used. For example, the contact sensor 214 may use a capacitance touch panel that identifies a contact position by detecting a change in capacitance. Further, the contact sensor 214 may use a resistance film touch panel that specifies a contact position by a change in voltage of two opposing resistance films. Alternatively, the contact sensor 214 may use an electromagnetic induction touch panel, for example, which detects electromagnetic induction caused by contact of an object to a display to specify the contact position.

In addition to or in alternative to detecting a touch by the tip or bottom of the stylus pen 290, the stylus pen controller 216 may also detect a touch by another part of the stylus pen 290, such as a part held by a hand of the user.

In the present embodiment, unless otherwise specified, the CPU 201 uses the RAM 203 as a work area to execute processing according to a control program.

Functional Configuration of Electronic Whiteboard

Figure 2:
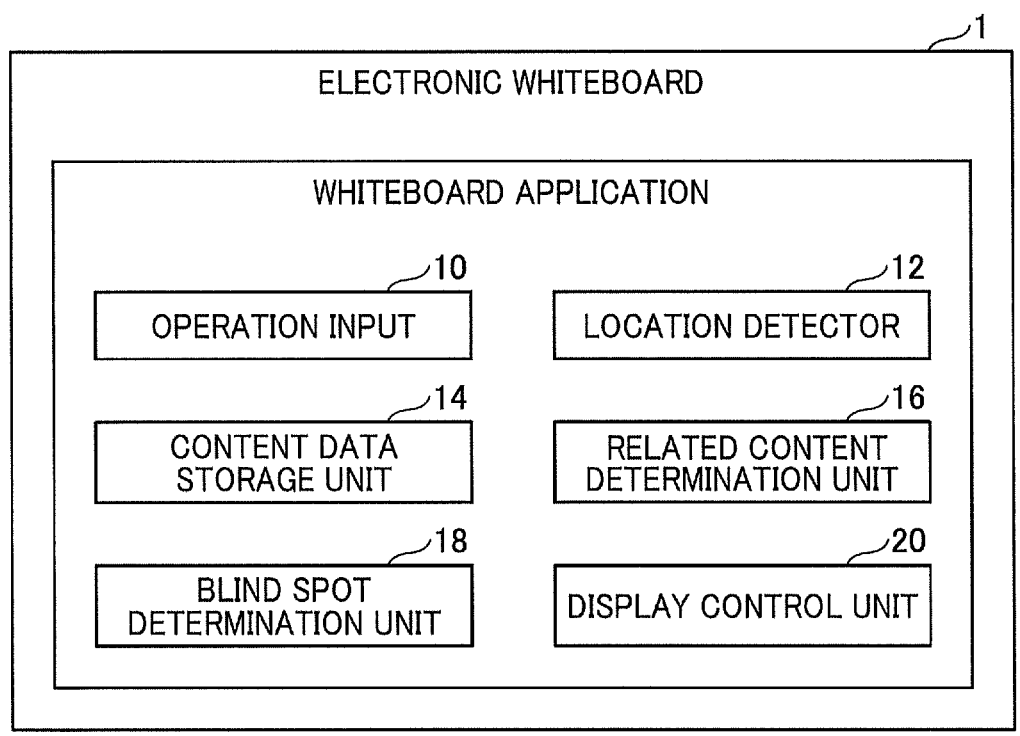
FIG. 2 is a schematic diagram illustrating a functional configuration of the electronic whiteboard according to the embodiment.

Next, referring to FIG. 2, functions of the electronic whiteboard 1 is described according to the embodiment. FIG. 2 is a schematic diagram illustrating a functional configuration of the electronic whiteboard 1 according to the embodiment. These units are functions that are implemented by or that are caused to function by operating any of the elements illustrated in FIG. 1 in cooperation with the instructions of the CPU 201 according to the control program expanded from such as the ROM 202 to the work area.

The electronic whiteboard 1 includes an operation input 10, a location detector 12, a content data storage unit 14, a related content determination unit 16, a blind spot determination unit 18, and a display control unit 20. In FIG. 2, one or more functions unnecessary for the description of the present embodiment are omitted.

The operation input 10, which is implemented by the instruction from the CPU 201, the contact sensor 214, and the stylus pen controller 216, illustrated in FIG. 1, receives operation on the display 280 such as a detected contact by an operator with the hand H or the stylus pen 290. The operator (an example of a first user), in this disclosure, is any user who inputs an instruction to the electronic whiteboard 1. The operation input 10 receives various operations on the display 280 from the operator such as writings of content, attachment of an image, etc. For example, the operation input 10 obtains coordinate data of a location touched by the user with the hand H or the stylus pen 290, and receives handwriting inputs by the user as a written content. The handwriting inputs correspond to a locus of coordinates at which the hand H or the like of the operator is in contact with the display surface.

The location detector 12 is implemented by the CPU 201 of FIG. 1, which executes processing according to the control program deployed in the RAM 203 as a work area. The location detector 12 detects a location of the operator of the electronic whiteboard 1 and a location of any person, other than the operator, who is near the electronic whiteboard 1 ("nearby person"), from the image captured by the camera 260, using any desired technique. In this disclosure, the nearby person (an example of a second user) is any person who views the display 280 of the electronic whiteboard 1, and is assumed to be farther away from the display 280 than the operator who often stands in front of the display 280. In other words, the operator is assumed to be at a position between the display 280 and the nearby person. The location detector 12 may detect the locations of the operator and the nearby person of the electronic whiteboard 1 using an infrared sensor, a distance sensor, a thermosensor, or the like, using any desired technique. In another example, the location detector 12 may estimate and detect the locations of the operator and the nearby person, from the coordinates of the written content written by the operator on the display 280. Further, in this example, the number of nearby persons is not limited to one.

The content data storage unit 14 is implemented by instructions from the CPU 201 of FIG. 1, and the SSD 204 of FIG. 1. The content data storage unit 14 stores a coordinate location, a size, and a time of content, such as written content written to the display 280 by the operator and an attached image.

The related content determination unit 16 is implemented by the CPU 201 of FIG. 1, which executes processing according to the control program deployed in the RAM 203 as a work area. The related content determination unit 16 determines the related content related to the written content written to a blind spot area, based on the attached image or the written content, which is displayed on the display 280, as described later. For simplicity, the written content and the attached image may be collectively referred to as a content.

The blind spot area is a part of a displayable area of the electronic whiteboard 1, which becomes a blind spot for the nearby person (that is, the nearby person cannot see), as such part is hidden by a body of the operator of the electronic whiteboard 1. In this disclosure, the displayable area of the electronic whiteboard 1 is a display surface of the display 280, in which one or more contents can be displayed in response to an operation received from the operator. The blind spot determination unit 18 is implemented by the CPU 201 of FIG. 1, which executes processing according to the control program deployed in the RAM 203 as a work area. The blind spot determination part 18 determines a blind spot area for the nearby person based on the locations of the operator and the nearby person detected by the location detector 12. For example, the blind spot determination unit 18 may determine the blind spot area using any desired technique such as the technique described in Japanese Patent Application Laid-Open Publication No. 2017-168039.

The display control unit 20 is implemented by instructions from the CPU 201, the GPU 212, the display controller 213, illustrated in FIG. 1. The display control unit 20 controls display of written content, images, and the like on the display 280. For example, the display control unit 20 controls the display 280 to display the written content written into the blind spot area and the related content related to the written content, in a displayable area outside the blind spot area (an area that is not hidden by a body or the like of the operator and can be viewed by a nearby person). In this disclosure, a displayable area in which the content written in the blind spot area and the related content are displayed, is called simply a displayable area 1006, and is any part of the displayable area other than the blind spot area.

Display Example 1 of Written Content and Related Content

Figure 3B:
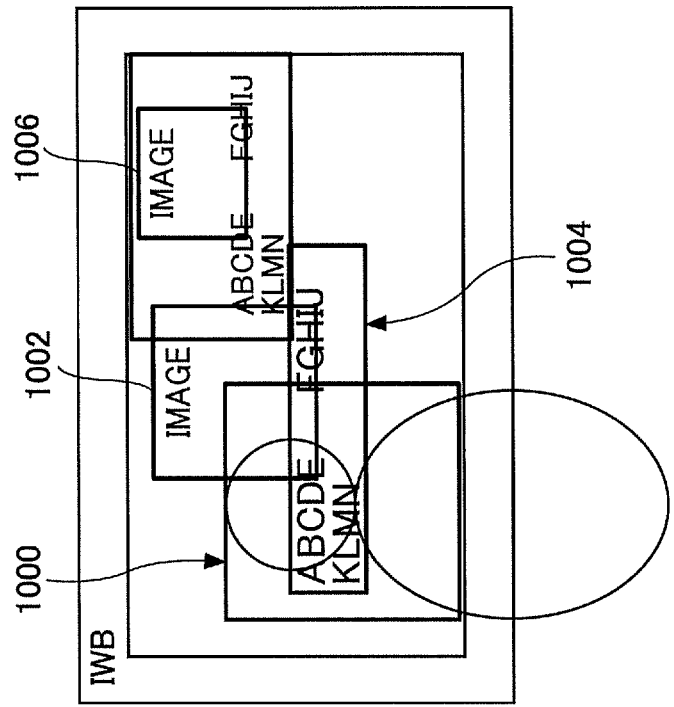
FIGS. 3A and 3B are diagrams for explaining an example of written content and related content in a blind spot area.
Figure 3A:
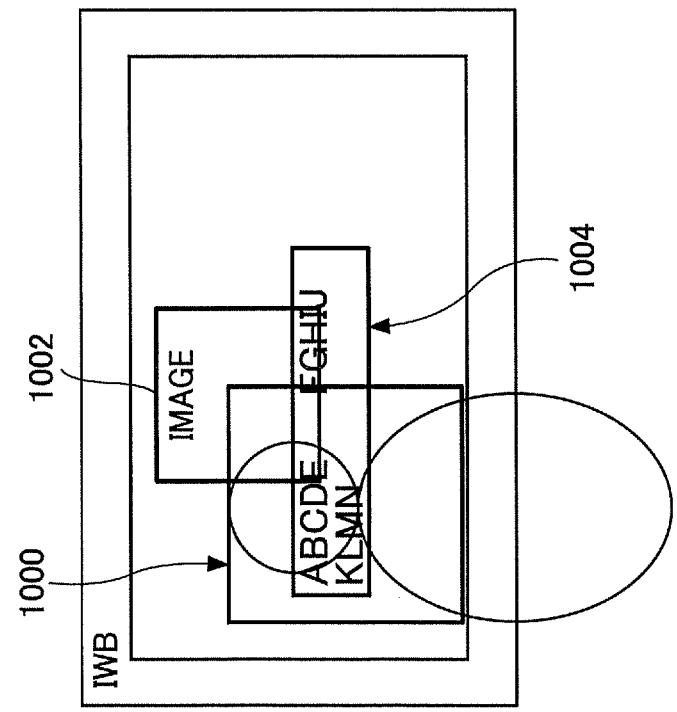

FIGS. 3A and 3B are diagrams for explaining an example of written content and related content in a blind spot area of a screen displayed by the display 280. FIG. 3A illustrates an example case in which a written content 1004 is written in a blind spot area 1000 of a screen of the electronic whiteboard 1, in which an image 1002 is displayed. The image 1002 is an example of content displayed on the display 280, and is, for example, an attached image attached to data displayed by the display 280. For example, a user may select any image, such as an image downloaded from the Internet or a screenshot image, to be attached to an image being displayed by the display 280, as the attached image.

The written content 1004 is written in the blind spot area 1000, at least partially. The written content 1004 written in the blind spot area 1000 is displayed so as to partially overlap the image 1002. The related content determination unit 16 determines the image 1002 as a related content related to the written content 1004 written in the blind spot area 1000.

FIG. 3B illustrates an example case in which the written content 1004 written in the blind spot area 1000 and the image 1002 which is determined to be the related content related to the written content 1004, are displayed in an area 1006 outside the blind spot area 1000.

Figure 4:
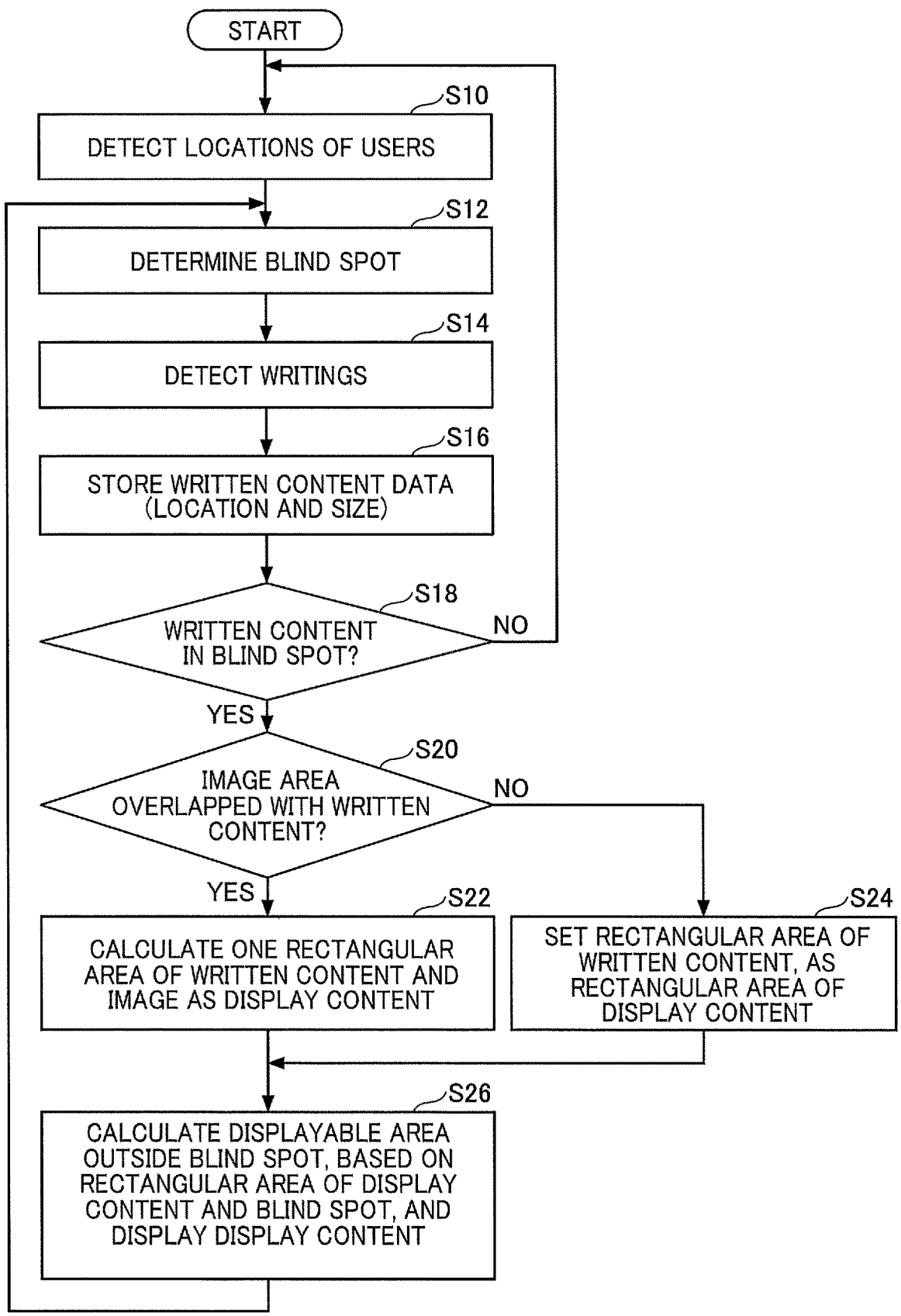
FIG. 4 is a flowchart illustrating an example processing performed by the electronic whiteboard according to the embodiment.

FIG. 4 is a flowchart illustrating an example processing performed by the electronic whiteboard 1 according to the present embodiment. At S10, the location detector 12 of the electronic whiteboard 1 detects the locations of the operator and the nearby person of the electronic whiteboard 1, using any one or combination of the image captured by the camera 260, the output signals of the various sensors, and the coordinate locations of the written content written by the operator.

At S12, the blind spot determination unit 18 determines a blind spot area of the nearby person based on the locations of the operator and the nearby person detected by the location detector 12. At S14, the operation input 10 receives an operation on the display 280, such as detection of a contact by the operator with the hand H or the stylus pen 290. For example, the operation input 10 obtains coordinate data of a location touched by the user with the hand H or the stylus pen 290, and detects handwriting inputs by the user as a written content.

At S16, the content data storage unit 14 stores a coordinate location, a size, and a time of a written content written to the display 280 by the operator, as information on content (such as information on a written content).

At S18, the related content determination unit 16 determines whether or not the written content detected at S14 is within the blind spot area. When it is determined that the written content is not within the blind spot area ("NO" at S18), the related content determination unit 16 returns operation to S10. When it is determined that the written content is within the blind spot area ("YES" at S18), the related content determination unit 16 proceeds operation to S20.

At S20, the related content determination unit 16 determines whether or not an area of the attached image displayed on the display 280 overlaps a rectangular area surrounding the written content detected at S14. For example, in the example of FIG. 3A, the related content determination unit 16 determines whether or not the area of the image 1002 attached to the display 280 overlaps the rectangular area surrounding the written content 1004 detected at S14.

When the area of the attached image displayed on the display 280 overlaps the rectangular area surrounding the written content detected at S14 ("YES" at S14), the related content determination unit 16 proceeds operation to S22. At S22, the related content determination unit 16 determines the attached image displayed on the display 280 as the related content. The display control unit 20 calculates one rectangular area that surrounds the determined related content and the written content detected at S14 as display content. For example, in the example of FIG. 3A, the display control unit 20 calculates one rectangular area that surrounds the image 1002 as the determined related content and the written content 1004 detected at S14 as the display content.

When the area of the attached image displayed on the display 280 does not overlap the rectangular area surrounding the written content detected at S14 ("NO" at S20), the related content determination unit 16 proceeds operation to S24. At S24, the display control unit 20 calculates a rectangular area that surrounds the written content detected at S14 as a display content.

At S26, the display control unit 20 calculates a displayable area 1006 of the screen that is outside of the blind spot area, based on the rectangular area calculated at S22 or S24 and the blind spot area determined at S12, and displays the display content in the displayable area 1006. At S26, the display control unit 20 calculates, for example, the displayable area 1006 outside the blind spot area, which has a largest size as much as possible. The display control unit 20 may reduce a size of the display content in the displayable area 1006, such that entire display content fits in the displayable area 1006.

Figure 5:
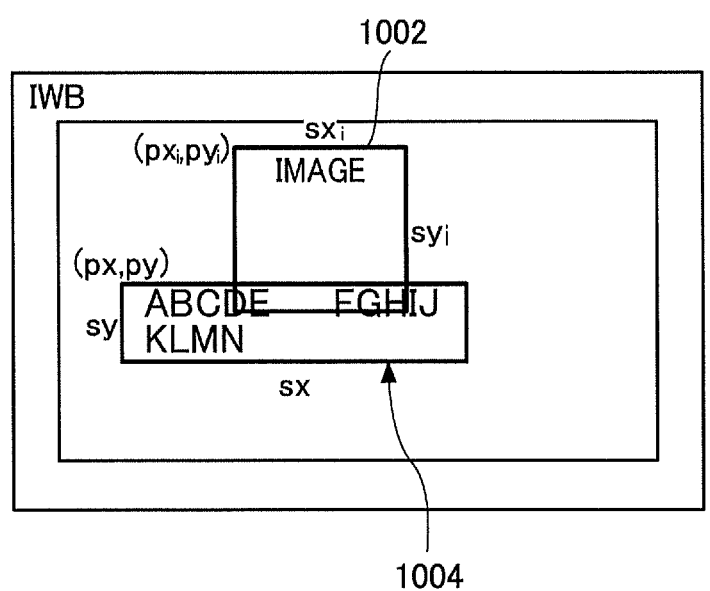
FIG. 5 is a diagram for explaining example processing of determining whether a written content overlaps an image.

The above-described processing of S20, which is to determine whether or not the area of the attached image displayed on the display 280 overlaps the rectangular area surrounding the written content detected at S14, is performed, for example, as illustrated in FIG. 5. FIG. 5 is a diagram for explaining example processing of determining whether a written content overlaps an image.

The content data storage unit 14 stores, as information on written content, a list of written content coordinates, a content location, a content size, a start time, and an end time.

Specifically, in this embodiment, the following writing data items are stored.

Written content coordinates (x1, y1) (x2, y2) (x3, y3)
Content location px, py
Content size sx, xy
Start time 0:40
End time 0:41

In this disclosure, the written content coordinates include coordinates of each of a plurality of points drawn by the user, which together makes up the written content.

The content location px is the minimum value of x coordinate, of the written content coordinates. The content location py is the minimum value of y coordinate, of the written content coordinates. That is, the content location px, py indicates minimum coordinate values of a rectangle represented by the written content coordinates.

The content size sx is a difference between the minimum x value and the maximum x value of the written content coordinates. The content size sy is a difference between the minimum y value and the maximum y value of the written content coordinates. That is, the content size indicates length (short length and long length) of the rectangle represented by the written content coordinates.

The content data storage unit 14 further stores, as information on the attached image displayed on the display 280, the content locations pxi and pyi, the content size sxi and syi, and the attachment time 0:43.

The related content determination unit 16 determines whether or not a rectangular area of the attached image 1002 is within (overlaps) a rectangular area of the written content 1004, based on the content location and the content size.

More specifically, in the example case of FIG. 5, determination is made as follows.

On the X-axis, it is determined whether any value ranging from the coordinate pxi to the coordinate (pxi+sxi) of the image 1002 is larger than the coordinate px of the written content 1004, and smaller than the coordinate (px+sx) of the written content 1004.

On the Y-axis, it is determined whether any value ranging from the coordinate pyi to the coordinate (pyi+syi) of the image 1002 is larger than the coordinate py of the written content 1004, and smaller than the coordinate (py+sy) of written content 1004.

According to the processes illustrated in FIGS. 3 to 5, the electronic whiteboard 1 displays the written content 1004 written in the blind spot area by the operator, and the image 1002 as the related content considered to be highly related to the written content 1004, in the displayable area 1006 outside the blind spot area. Since the nearby person can view not only the written content 1004 written in the blind spot area in the displayable area 1006 outside the blind spot area, but also the image 1002 which is the related content of the written content 1004, the nearby person can easily understand the written content 1004. In this manner, the electronic whiteboard 1 is able to display the written content 1004 written in the blind spot area 1000 in the displayable area outside the blind spot area so as to be easily understood by the nearby person.

Display Example 2 of Written Content and Related Content

Figure 6A:
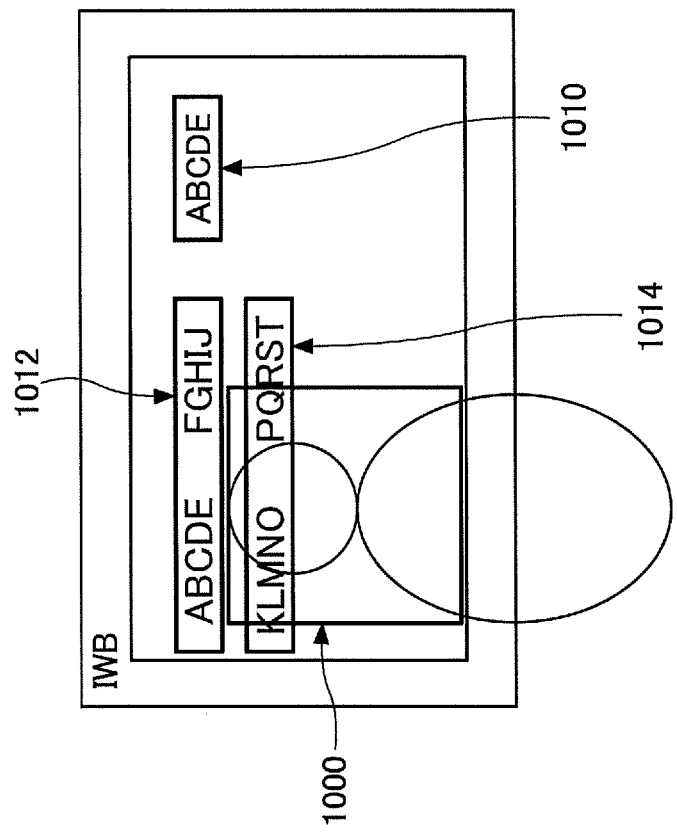
FIGS. 6A and 6B are diagrams for explaining an example of written content and related content in a blind spot area.
Figure 6B:
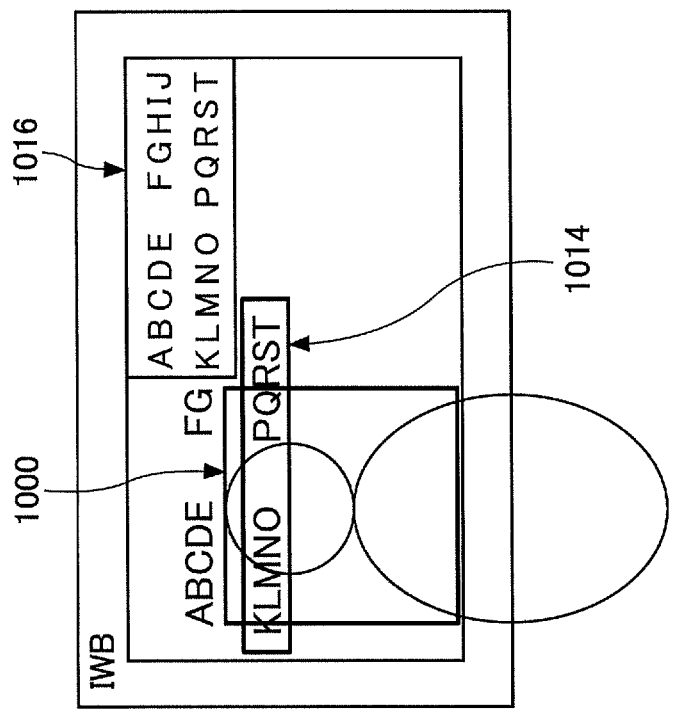

FIGS. 6A and 6B are diagrams for explaining an example of written content and related content in a blind spot area of a screen displayed by the display 280. FIG. 6A illustrates an example case in which a written content 1014 is written in a blind spot area 1000 of a screen of the electronic whiteboard 1, in which written contents 1010 and 1012 are displayed. The written contents 1010 and 1012 are examples of written contents already displayed on the display 280.

The written content 1014 is written in the blind spot area 1000, at least partially. The written content 1014 written in the blind spot area 1000 is displayed within a preset distance from the written content 1012. The related content determination unit 16 determines the written content 1012 as a related content related to the written content 1014 written to the blind spot area 1000.

FIG. 6B illustrates an example case in which the written content 1014 written in the blind spot area 1000 and the written content 1012 which is determined to be the related content related to the written content 1014, are displayed in an area 1016 outside the blind spot area 1000.

Figure 7:
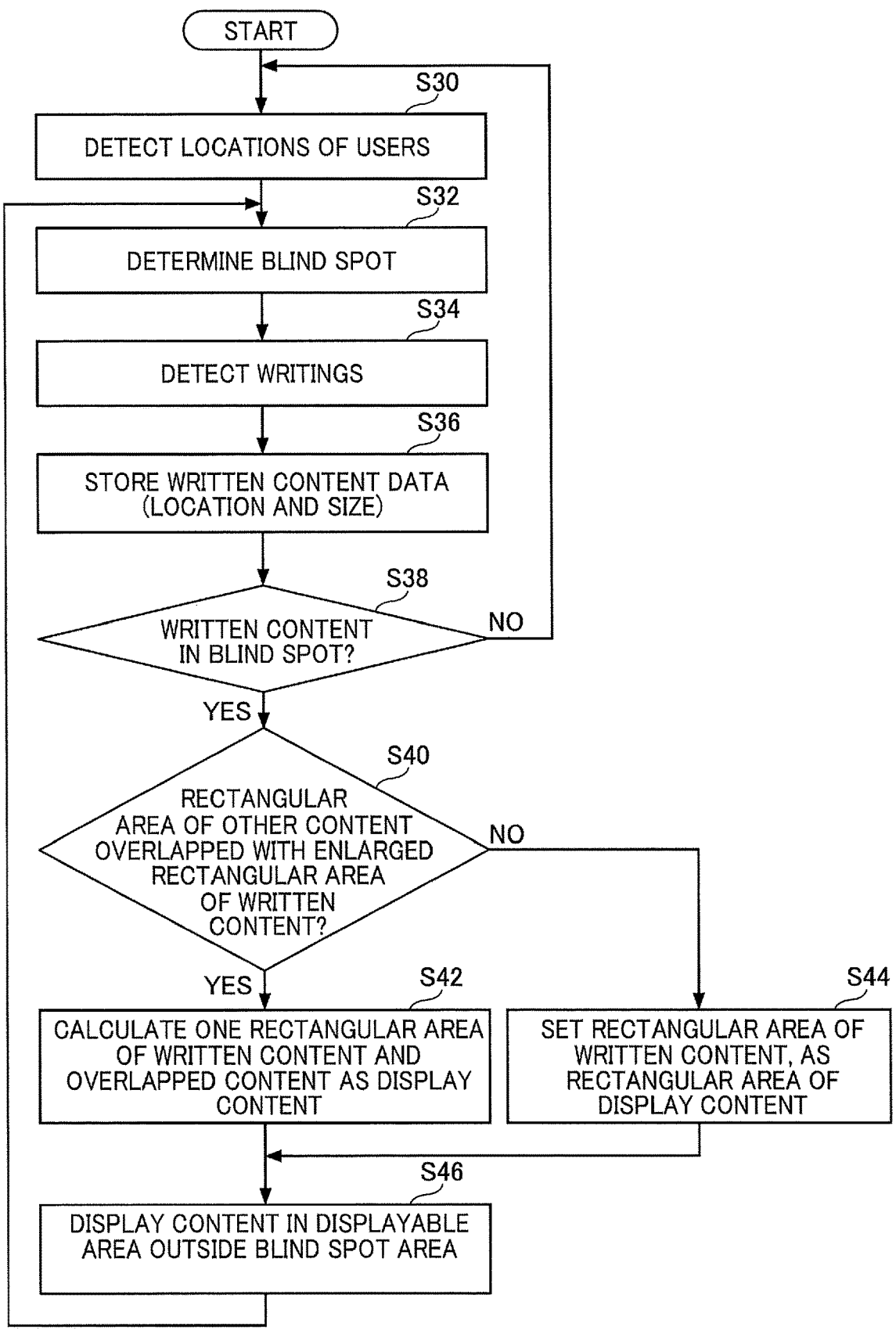
FIG. 7 is a flowchart illustrating an example processing performed by the electronic whiteboard according to the embodiment.

FIG. 7 is a flowchart illustrating an example processing performed by the electronic whiteboard 1 according to the present embodiment. The processing of the flowchart illustrated in FIG. 7 is the same as that of FIG. 4 except for some differences described below, and the description thereof will be appropriately omitted. The processes of S30 to S38 in FIG. 7 are the same as those processes of S10 to S18 in FIG. 4.

At S40, the related content determination unit 16 determines whether or not a rectangular area surrounding another written content overlaps an enlarged rectangular area, which is obtained by enlarging a rectangular area surrounding the written content detected at S34 by a preset size. For example, in the example of FIG. 6A, it is determined whether or not an area having the other written contents 1010 and 1012 overlap with an enlarged rectangular area of the written content 1014 detected at S34.

When at least one of the area of the written content 1010 and the area of the written content 1012 overlaps the enlarged rectangular area of the written content 1014 detected at S34 ("YES" at S40), the related content determination unit 16 proceeds operation to S42. At S42, the related content determination unit 16 determines, as the related content, at least one of the written content 1010 and the written content 1012 whose area overlaps the enlarged rectangular area of the written content 1014 detected at S34. The display control unit 20 calculates one rectangular area that surrounds the determined related content and the written content detected at S34 as display content. For example, in the example of FIG. 6A, the display control unit 20 calculates one rectangular area that surrounds the written content 1012 as the determined related content and the written content 1014 detected at S34 as the display content.

When none of the area of the written content 1010 and the area of the written content 1012 overlaps the enlarged rectangular area of the written content 1014 detected at S34 ("NO" at S40), the related content determination unit 16 proceeds operation to S44. At S44, the display control unit 20 calculates a rectangular area that surrounds the written content detected at S34 as a display content.

At S46, the display control unit 20 calculates a displayable area 1016 of the screen that is outside of the blind spot area, based on the rectangular area calculated at S42 or S44 and the blind spot area determined at S32, and displays the display content in the displayable area 1016. At S46, the display control unit 20 calculates, for example, the displayable area 1016 outside the blind spot area, which has a largest size as much as possible. The display control unit 20 may reduce a size of the display content in the displayable area 1016, such that entire display content fits in the displayable area 1016.

Figure 8:
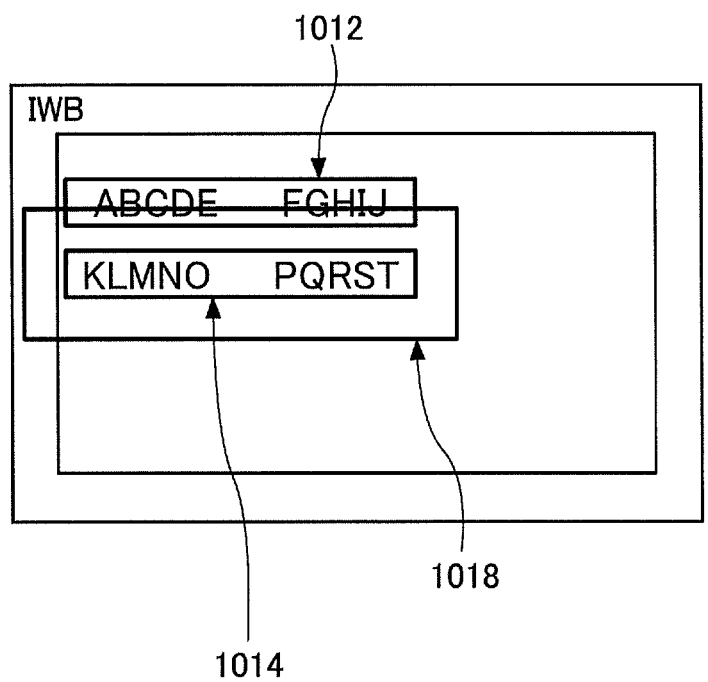
FIG. 8 is a diagram for explaining example processing of determining another written content, which is displayed within a preset distance from the written content.

The above-described processing of S40, which is to determine whether or not at least one of the area of the other written content 1010 and the area of the other written content 1012 overlaps an enlarged rectangular area of the written content 1014 detected at S34, is performed, for example, as illustrated in FIG. 8. FIG. 8 is a diagram for explaining example processing of determining another written content, which is displayed within a preset distance from the written content.

The content data storage unit 14 stores, as information on the written content 1014 and the written content 1012, a list of written content coordinates, a content location, a content size, a start time, and an end time. More specifically, information on written content 1012 (an example of first written content) and information on written content 1014 (an example of second written content) are stored.

Information on first written content 1012
Written content coordinates (x11, y11) (x12, y12) (x13, y13)
Content location px1, py1
Content size sx1, xy1
Start time 0:40
End time 0:41
Information on second written content 1014
Written content coordinates (x21, y21) (x22, y22) (x23, y23)
Content location px2, py2
Content size sx2, xy2
Start time 0:43
End time 0:44

The related content determination unit 16 determines whether or not a rectangular area of another written content 1012 is included (overlapped) within the rectangular area 1018, obtained by enlarging the rectangular area of the written content 1014 by a preset size, based on the content location and the content size. For example, the rectangular area of the written content 1014 is enlarged by a preset value "a".

On the X-axis, it is determined whether any value ranging from the coordinate px1 to (px1+sx1) of written content 1012 is larger than the coordinate (px2−a) of the written content 1014, and smaller than the coordinate (px2+sx2+a) of the written content 1014.

On the Y-axis, it is determined whether any value ranging from the coordinate py1 to (py1+sy1) of written content 1012 is larger than the coordinate (py2+a) of the written content 1014, and smaller than the coordinate (py2+sy2+a) of the written content 1014.

According to the processes illustrated in FIGS. 6 to 8, the electronic whiteboard 1 displays, in the displayable area 1016 outside the blind spot area, the written content 1014 written in the blind spot area by the operator and the other written content 1012 as the related content considered to be highly related to the written content 1014. Since the nearby person can view not only the written content 1014 written in the blind spot area in the displayable area 1016 outside the blind spot area, but also other written content 1012 which is related content to the written content 1014, the nearby person can easily understand the written content 1014. In this manner, the electronic whiteboard 1 is able to display the written content 1014 written in the blind spot area 1000 in the displayable area outside the blind spot area so as to be easily understood by the nearby person.

Display Example 3 of Written Content and Related Content

Figure 9A:
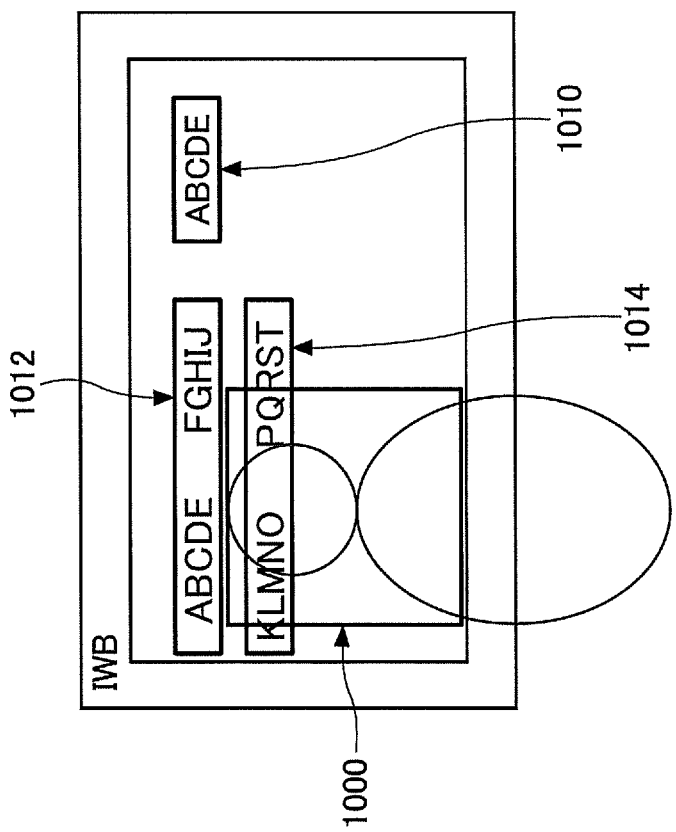
FIGS. 9A and 9B are diagrams for explaining an example of written content and related content in a blind spot area.
Figure 9B:
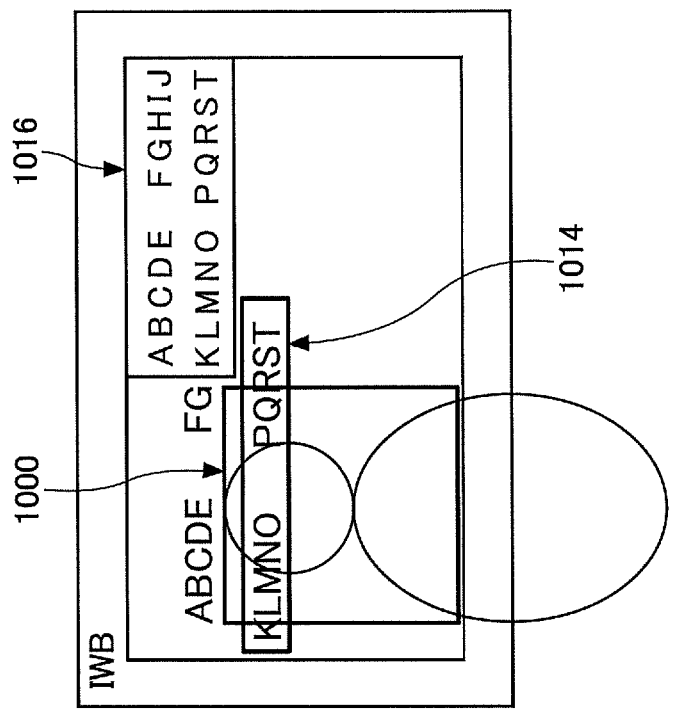

FIGS. 9A and 9B are diagrams for explaining an example of written content and related content in a blind spot area of a screen displayed by the display 280. FIG. 9A illustrates an example case in which a written content 1014 is written in a blind spot area 1000 of a screen of the electronic whiteboard 1, in which written contents 1010 and 1012 are displayed. The written contents 1010 and 1012 are examples of written contents already displayed on the display 280.

In this example, the write time at which the written content 1010 was written is "0:10". The write time of the written content 1012 is "0:40". The write time of the written content 1014 is "0:43".

The written content 1014 is written in the blind spot area 1000, at least partially. The written content 1014 written in the blind spot area 1000 is displayed at a write time "0:43" within a preset time from the write time "0:40" of the written content 1012. The related content determination unit 16 determines the written content 1012 as a related content related to the written content 1014 written to the blind spot area 1000.

FIG. 9B illustrates an example case in which the written content 1014 written in the blind spot area 1000 and the written content 1012 which is determined to be the related content related to the written content 1014, are displayed in an area 1016 outside the blind spot area 1000.

Figure 10:
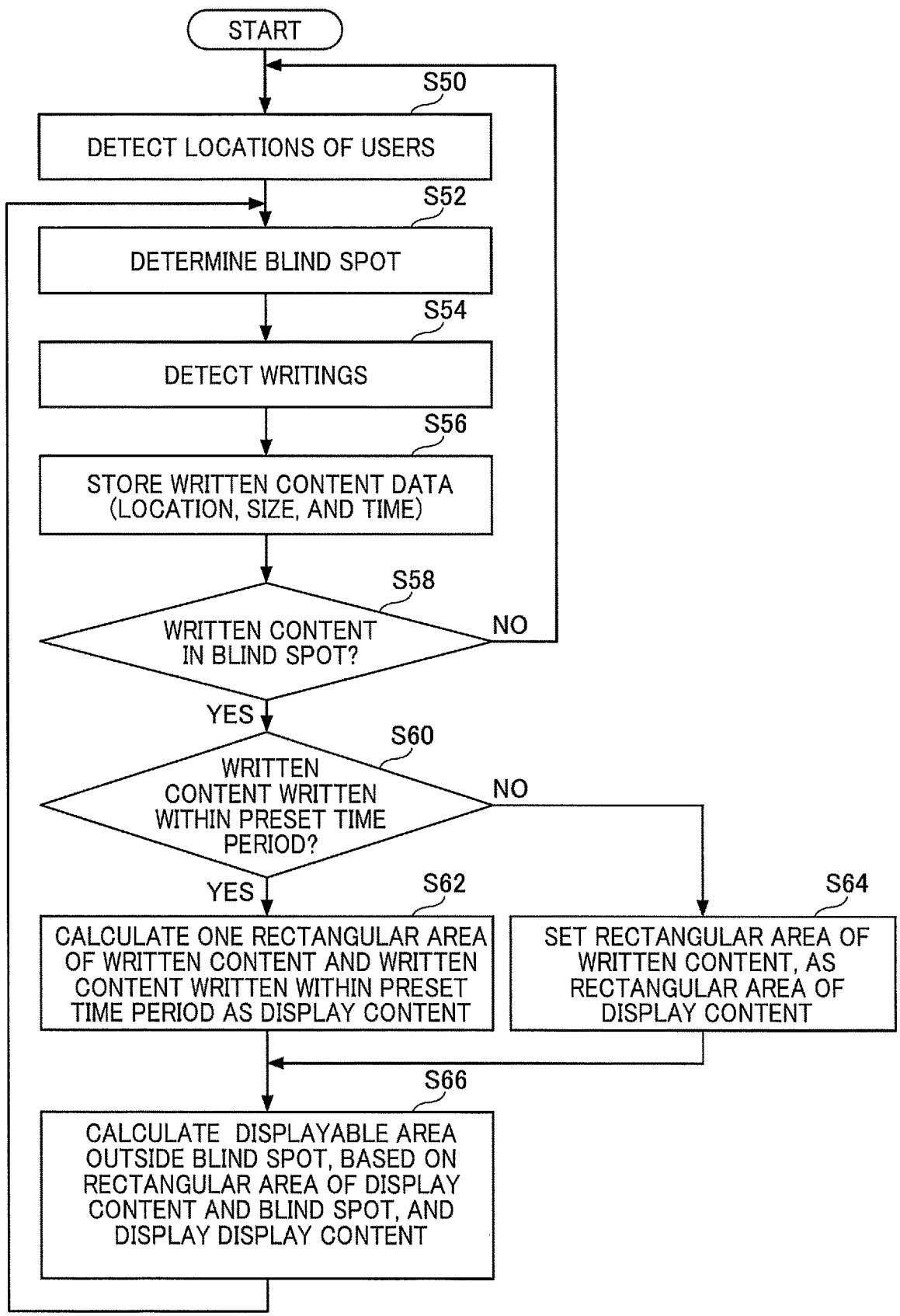
FIG. 10 is a flowchart illustrating an example processing performed by the electronic whiteboard according to the embodiment.

FIG. 10 is a flowchart illustrating an example processing performed by the electronic whiteboard 1 according to the present embodiment. The processing of the flowchart illustrated in FIG. 10 is the same as that of FIGS. 4 and 7 except for some differences described below, and the description thereof will be appropriately omitted. The processes of S50 to S58 in FIG. 10 are the same as those processes of S10 to S18 in FIG. 4.

At S60, the related content determination unit 16 determines whether or not there is any written content that was written at the write time that falls within a preset time period counted from the write time of the written content detected at S54. For example, in the example of FIG. 9A, the write time of the written content 1014 detected at S54 is compared with the write time of the written content 1010 and the write time of the written content 1012, respectively. In the example of FIG. 9A, it is determined whether or not there is any written content having a write time that falls within a preset time period counted from the write time of the write content 1014.

When there is any written content having a write time that falls within the preset time period counted from the write time of the written content detected at S54 ("YES" at S60), the related content determination unit 16 proceeds operation to S62. The related content determination unit 16 determines, as the related content, the written content 1012 having a write time that falls within the preset time period counted from the write time of the written content detected at S54. At S62, the display control unit 20 calculates one rectangular area using the determined related content and the written content detected at S54 as display content. For example, in the example of FIG. 9A, the display control unit 20 calculates one rectangular area that surrounds the written content 1012 as the determined related content and the written content 1014 detected at S54 as the display content.

When there is no written content having a write time that falls within the preset time period counted from the write time of the written content detected at S54 ("NO" at S60), the related content determination unit 16 proceeds operation to S64. At S64, the display control unit 20 calculates a rectangular area that surrounds the written content detected at S54 as a display content.

At S66, the display control unit 20 calculates a displayable area 1016 of the screen that is outside the blind spot area, based on the rectangular area calculated at S62 or S64 and the blind spot area determined at S52, and displays the display content in the displayable area 1016. At S66, the display control unit 20 calculates, for example, the displayable area 1016 outside the blind spot area, which has a largest size as much as possible. The display control unit 20 may reduce a size of the display content in the displayable area 1016, such that entire display content fits in the displayable area 1016.

Figure 11:
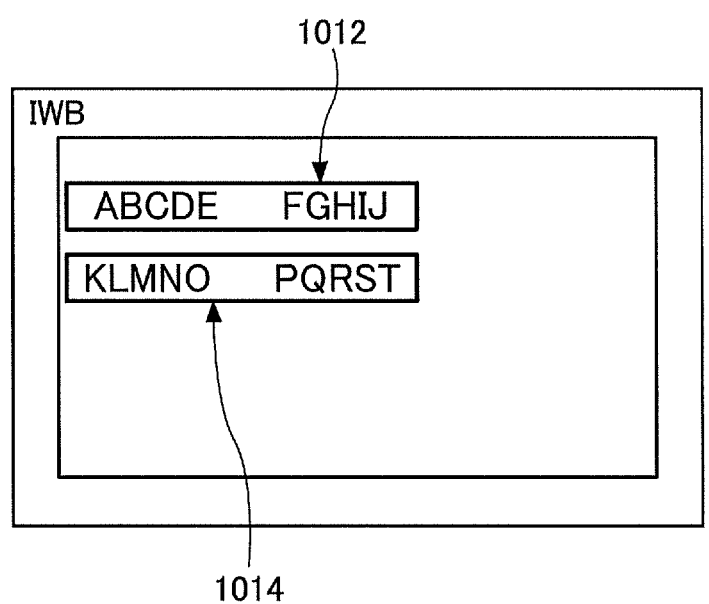
FIG. 11 is a diagram for explaining an example processing of determining another written content, which is displayed within a preset time period from the write time of the written content.

The processing of step S54, which is to determine whether or not there is any written content that was written at the write time that falls within a preset time period counted from the write time of the written content detected at S60, is performed, for example, as illustrated in FIG. 11. FIG. 11 is a diagram for explaining an example processing of determining another written content, which is displayed within a preset time period from the write time of the written content.

The content data storage unit 14 stores, as information on the written content 1014 and the written content 1012, a list of written content coordinates, a content location, a content size, a start time, and an end time.

Information on first written content 1012
Written content coordinates (x11, y11) (x12, y12) (x13, y13)
Content location px1, py1
Content size sx1, xy1
Start time 0:40
End time 0:41
Information on second written content 1014
Written content coordinates (x21, y21) (x22, y22) (x23, y23)
Content location px2, py2
Content size sx2, xy2
Start time 0:43
End time 0:44

The related content determination unit 16 determines, as the related content, another written content that was displayed within the preset time period counted from the write time of the written content that is detected, using the start time of the written content and the end time of another written content.

More specifically, it is determined whether or not a value obtained by subtracting a value of the preset time from the start time of the second written content 1014 is smaller than the end time of the first written content 1012.

According to the processes illustrated in FIGS. 9 to 11, the electronic whiteboard 1 displays, in the displayable area 1016 outside the blind spot area, the written content 1014 written in the blind spot area by the operator and the other written content 1012 as the related content considered to be highly related to the written content 1014. Since the nearby person can view not only the written content 1014 written in the blind spot area in the displayable area 1016 outside the blind spot area, but also other written content 1012 which is related content to the written content 1014, the nearby person can easily understand the written content 1014. In this manner, the electronic whiteboard 1 is able to display the written content 1014 written in the blind spot area 1000 in the displayable area outside the blind spot area so as to be easily understood by the nearby person.

Display Example 4 of Written Content and Related Content

Figure 12:
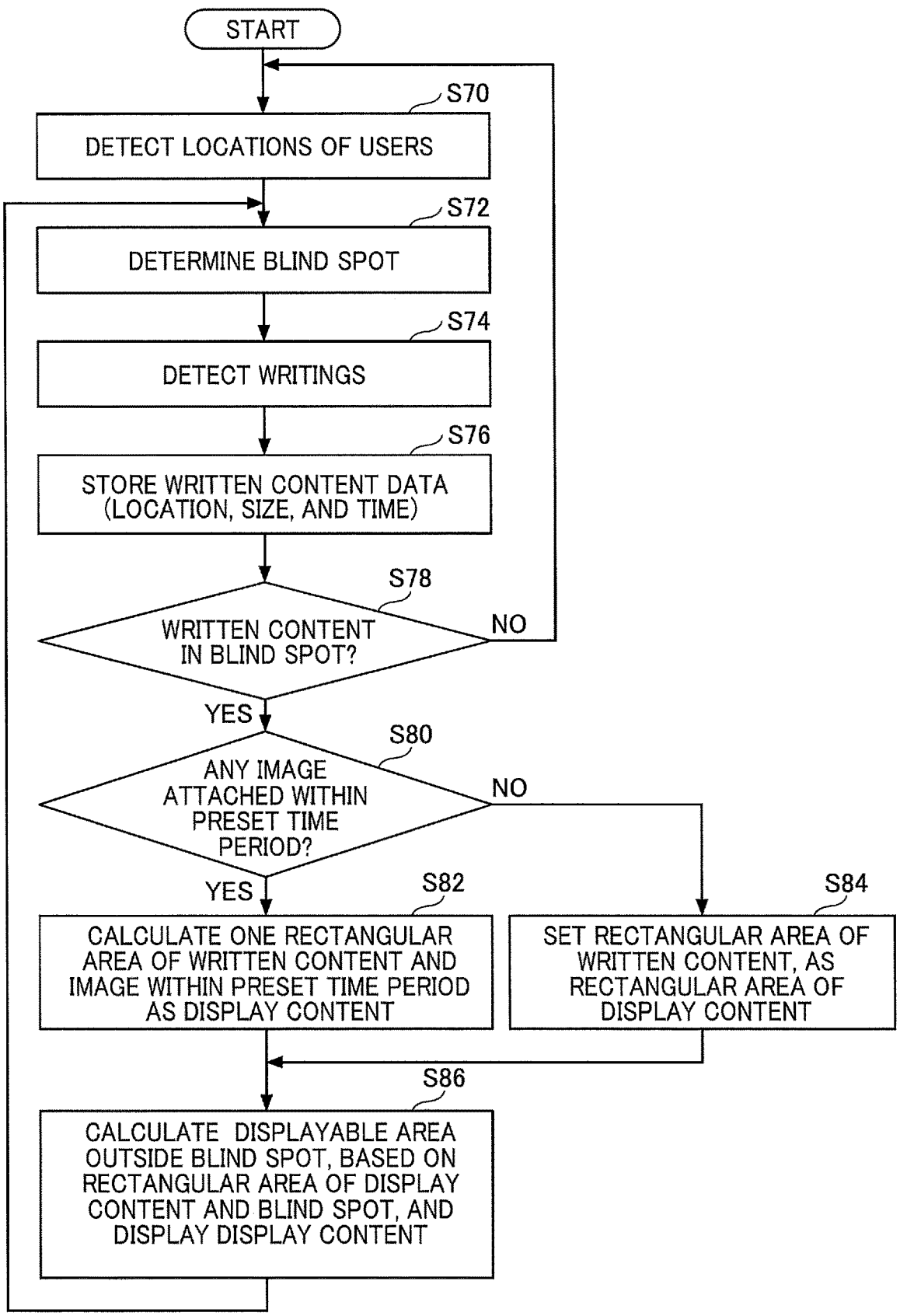
FIG. 12 is a flowchart illustrating an example processing performed by the electronic whiteboard according to the embodiment.

Although FIG. 9 illustrates an example in which the related content is another written content, the related content may be, for example, the attached image 1002 as illustrated in FIG. 5. FIG. 12 is a flowchart illustrating an example processing performed by the electronic whiteboard 1 according to the present embodiment. The processing of the flowchart illustrated in FIG. 12 is the same as that of FIG. 10 except for some differences described below, and the description thereof will be appropriately omitted. The processes of S70 to S78 in FIG. 12 are the same as those processes of S50 to S58 in FIG. 10.

At S80, the related content determination unit 16 determines whether or not there is any image that was attached at the time that falls within a preset time period counted from the write time of the written content detected at S74.

When there is any image attached at the time that falls within the preset time period counted from the write time of the written content detected at S74 ("YES" at S80), the related content determination unit 16 proceeds operation to S82. The related content determination unit 16 determines, as the related content, the image 1002, on the display 280, which is attached at the time that falls within the preset time period counted from the write time of the written content detected at S74.

The display control unit 20 calculates one rectangular area that surrounds the determined related content and the written content detected at S74 as display content.

When there is no image attached at the time that falls within the preset time period counted from the write time of the written content detected at S74 ("NO" at S80), the related content determination unit 16 proceeds operation to S84. At S84, the display control unit 20 calculates a rectangular area that surrounds the written content detected at S74 as a display content.

At S86, the display control unit 20 calculates a displayable area 1006 of the screen that is outside the blind spot area, based on the rectangular area calculated at S82 or S84 and the blind spot area determined at S72, and displays the display content in the displayable area 1016. At S86, the display control unit 20 calculates, for example, the displayable area 1016 outside the blind spot area, which has a largest size as much as possible. The display control unit 20 may reduce a size of the display content in the displayable area 1016, such that entire display content fits in the displayable area 1016.

Figure 13:
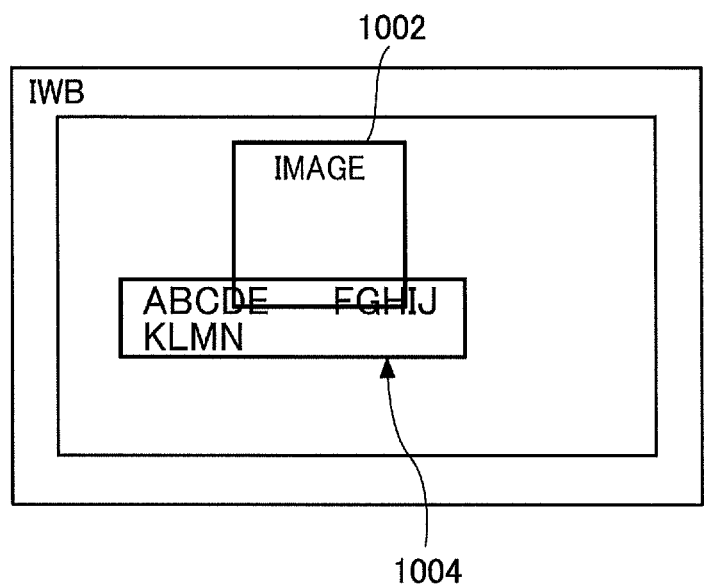
FIG. 13 is a diagram for explaining an example processing of determining an attached image, which is displayed within a preset time period from the write time of the written content.

The processing of step S80, which is to determine whether or not there is any image that was attached at the time that falls within a preset time period counted from the write time of the written content detected at S74, is performed, for example, as illustrated in FIG. 13. FIG. 13 is a diagram for explaining an example processing of determining an image attached, which is displayed within a preset time period from the write time of the written content.

The content data storage unit 14 stores, as information on written content, a list of written content coordinates, a content location, a content size, a start time, and an end time.

Information on written content

Written content coordinates (x1, y1) (x2, y2) (x3, y3)

Content location px, py

Content size sx, xy

Start time 0:40

End time 0:41

The content data storage unit 14 further stores, as information on the attached image displayed on the display 280, the content locations pxi and pyi, the content size sxi and syi, and the attachment time 0:43.

The related content determination unit 16 determines, as the related content, an image that was attached within the preset time period counted from the write time of the written content that is detected, using the start time of the written content and the time when the image is attached. More specifically, it is determined whether a value obtained by subtracting a value of preset time from the start time of written content is smaller than (before) the time when the image is attached.

According to the processes illustrated in FIGS. 12 to 13, the electronic whiteboard 1 displays the written content 1004 written in the blind spot area by the operator, and the image 1002 as the related content considered to be highly related to the written content 1004, in the displayable area 1006 outside the blind spot area. Since the nearby person can view not only the written content 1004 written in the blind spot area in the displayable area 1006 outside the blind spot area, but also the image 1002 which is the related content of the written content 1004, the nearby person can easily understand the written content 1004. In this manner, the electronic whiteboard 1 is able to display the written content 1004 written in the blind spot area 1000 in the displayable area outside the blind spot area so as to be easily understood by the nearby person.

Setting of Condition for Related Content

Figure 14:
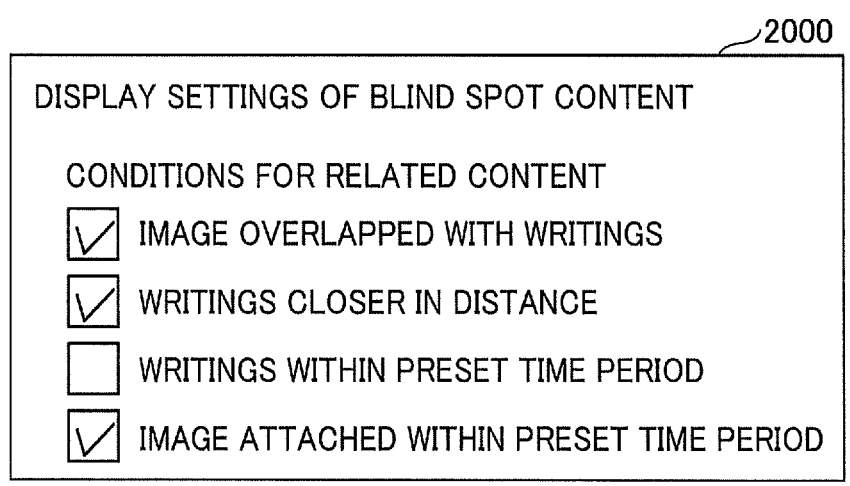
FIG. 14 is a diagram of an example setting screen of the condition for the related content.

The condition for determining the related content may be set from a setting screen 2000 of FIG. 14, for example. FIG. 14 is a diagram of an example setting screen of the condition for the related content. The setting screen 2000 includes "image overlapped with writings", "writings closer in distance", "writings within a preset time period", and "image attached within a preset time period", as conditions for determining related content.

For example, the operator may set one or more conditions for the related content, by checking a corresponding check box in the setting screen 2000 illustrated in FIG. 14. For example, the condition "image overlapped with writings" corresponds to the case illustrated in FIG. 5. The condition "writings close in distance" corresponds to the case illustrated in FIG. 8. The condition "writings within a preset time period" corresponds to the case illustrated in FIG. 11. The condition "image attached within a preset time period" corresponds to the case illustrated in FIG. 13.

Time at Which Displaying of Area Outside Blind Spot Area Starts

For example, the display control unit 20 displays the written content 1004 written in the blind spot area 1000 by the operator, and the image 1002 as the related content considered to be highly related to the written content 1004, in the displayable area 1006 outside the blind spot area. The time at which the display 208 starts displaying the content in the displayable area 1006 is, for example, the time at which the related content is determined. Alternatively, the time at which the display 208 starts displaying the content in the displayable area 1006 outside the blind spot area may be the time at which the written content written in the blind spot area 1000 exceeds a predetermined amount (the number of characters, the amount of data, the area of a rectangular area surrounding the written content, or the like).

For example, in case the electronic whiteboard 1 starts displaying the content in the displayable area 1006 outside the blind spot area at the time when the related content is determined, the electronic whiteboard 1 may first display the written content 1004 written in the blind spot area 1000 in the displayable area 1006 outside the blind spot area 1000 until the related content is determined. Thereafter, when the related content is determined, the electronic whiteboard 1 starts displaying the related content of the written content 1004 in the displayable area 1006 outside the blind spot area 1000, together with the written content 1004 written in the blind spot area.

Time at Which Displaying of Area Outside Blind Spot Area Ends

For example, the display control unit 20 may set a change in the blind spot area 1000, a lapse of time from the start of the display in the displayable area 1006 outside the blind spot area 1000, or the like, as the time to end the display in the displayable area 1006 outside the blind spot area 1000.

In this manner, the electronic whiteboard 1 is able to display the written content 1014 written in the blind spot area 1000 in the displayable area outside the blind spot area so as to be easily understood by the nearby person.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

In alternative to the electronic whiteboard described above, the present disclosure is applicable to any information processing apparatus with a touch panel. Further, an electronic whiteboard is also referred to as an electronic blackboard, an electronic information board, an interactive board, etc. Examples of the information processing apparatus with a touch panel include, but not limited to, a projector (PJ), a data output device such as a digital signage, a head up display (HUD), an industrial machine, an imaging device such as a digital camera, a sound collecting device, a medical device, a network home appliance, a notebook personal computer (PC), a mobile phone, a smartphone, a tablet terminal, a game machine, a personal digital assistant (PDA), a wearable PC, and a desktop PC.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), and field programmable gate array (FPGA), and conventional circuit components arranged to perform the recited functions.

Any one of the above-described operations may be performed in various other ways, for example, in an order different from the one described above.

The invention claimed is:

1. An apparatus for controlling display, comprising circuitry configured to:
    display one or more contents in a displayable area of a display, in response to an operation received from a first user;
    determine a part of the displayable area hidden by the first user, as a blind spot area for a second user, the second user locating farther from the display than the first user;
    detect a written content written in the blind spot area;
    determine at least one related content related to the written content that is detected, from the one or more contents displayed on the display; and
    control the display to display the written content and the related content in the blind spot area and in a part of the displayable area other than the blind spot area.

2. The apparatus of claim 1, wherein the circuitry is configured to
    determine whether an area of any of the one or more contents overlaps an area of the written content written in the blind spot area, and
    determine, as the related content, at least one particular content having the area that at least partially overlaps the area of the written content written in the blind spot area.

3. The apparatus of claim 1, wherein the circuitry is configured to
    determine, as the related content, at least one particular content that is displayed within a preset distance from the written content written in the blind spot area.

4. The apparatus of claim 1, wherein the circuitry is configured to
    determine, as the related content, at least one particular content that was written within a preset time period from a time when the written content was written in the blind spot area.

5. The apparatus of claim 1, wherein the circuitry is configured to
    start displaying the written content and the related content in the part of the displayable area other than the blind spot area, in response to determination of the related content.

6. The apparatus of claim 1, wherein the circuitry is configured to
    display the written content written in the blind spot area, in the part of the displayable area other than the blind spot area, during a time period when the related content related to the written content has not been determined, and
    display the written content in the blind spot area, and the related content, in the part of the displayable area other than the blind spot area, in response to determination of the related content.

7. The apparatus of claim 1, wherein the circuitry is configured to
    detect a location of the first user and a location of the second user, and
    determine the blind spot area, based on the detected location of the first user and the detected location of the second user.

8. The apparatus of claim 1, wherein the circuitry is configured to
    determine the blind spot area, based on a part of the displayable area of the display that receives the operation from the first user.

9. The apparatus of claim 1, Wherein the one or more contents displayed in the displayable area of the display include at least one of a written content previously written by the first user or an image previously attached by the first user.

10. A method for controlling display, the method comprising:
    displaying one or more contents in a displayable area of a display, in response to an operation received from a first user;
    determining a part of the displayable area hidden by the first user, as a blind spot area for a second user, the second user locating farther from the display than the first user;
    detecting a written content written in the blind spot area;
    determining at least one related content related to the written content that is detected, from the one or more contents displayed on the display; and
    controlling the display to display the written content and the related content in the blind spot area and in a part of the displayable area other than the blind spot area.

11. A non-transitory recording medium which, when executed by one or more processors, cause the processors to perform a method for controlling display, comprising:
    displaying one or more contents in a displayable area of a display, in response to an operation received from a first user;
    determining a part of the displayable area hidden by the first user, as a blind spot area for a second user, the second user locating farther from the display than the first user;
    detecting a written content written in the blind spot area;
    determining at least one related content related to the written content that is detected, from the one or more contents displayed on the display; and
    controlling the display to display the written content and the related content in the blind spot area and in a part of the displayable area other than the blind spot area.

* * * * *